(12) United States Patent
Malos et al.

(10) Patent No.: US 11,536,597 B2
(45) Date of Patent: Dec. 27, 2022

(54) DEVICE AND METHOD FOR MONITORING MATERIAL FLOW PARAMETERS ALONG A PASSAGE

(71) Applicant: Commonwealth Scientific and Industrial Research Organisation, Acton (AU)

(72) Inventors: John Malos, Pullenvale (AU); Mark Dunn, Pullenvale (AU); Peter Reid, Pullenvale (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 0 days.

(21) Appl. No.: 16/637,493

(22) PCT Filed: Aug. 7, 2018

(86) PCT No.: PCT/AU2018/050819
§ 371 (c)(1),
(2) Date: Feb. 7, 2020

(87) PCT Pub. No.: WO2019/028499
PCT Pub. Date: Feb. 14, 2019

(65) Prior Publication Data
US 2020/0249058 A1    Aug. 6, 2020

(30) Foreign Application Priority Data
Aug. 10, 2017 (AU) .................. 2017903188

(51) Int. Cl.
*G01F 1/661* (2022.01)
*G01F 1/74* (2006.01)
(Continued)

(52) U.S. Cl.
CPC .............. *G01F 1/661* (2013.01); *G01F 1/74* (2013.01); *G01F 1/86* (2013.01); *G01N 21/53* (2013.01);
(Continued)

(58) Field of Classification Search
CPC ................... G01N 21/85; G01N 15/06; G01N 2015/0046; G01N 2015/0693;
(Continued)

(56) References Cited

U.S. PATENT DOCUMENTS

| | | | |
|---|---|---|---|
| 4,429,995 A | 2/1984 | Goulas | |
| 6,088,098 A | 7/2000 | Arndt et al. | |

(Continued)

FOREIGN PATENT DOCUMENTS

| | | |
|---|---|---|
| CN | 101910821 A | 12/2010 |
| CN | 104330398 A | 2/2015 |

(Continued)

OTHER PUBLICATIONS

International Search Report for corresponding PCT Application No. PCT/AU2018/050819 dated Aug. 10, 2018.
(Continued)

*Primary Examiner* — Tri T Ton
(74) *Attorney, Agent, or Firm* — Caesar Rivise, PC

(57) ABSTRACT

Described herein is a device (1) for measuring parameters of a material (3) flowing along a passage (5), the passage having two longitudinally spaced apart ends and transverse sides defined by one or more sidewalls (7, 9). The device (1) includes a laser source (15) positioned at a first location within or adjacent a side of the passage (5) and configured to generate a laser beam (17) at one or more predetermined frequencies. A beam projection element (21, 27) projects the laser beam (17) transversely across the passage (5) to irradiate the material (3) within a measuring zone (19). The
(Continued)

measuring zone (19) includes a transverse region extending greater than 50% of the width of the passage (5). An optical imaging device (29) is positioned at a second location within or adjacent the passage (5) and configured to capture images of backscattered light from material (3) within the measuring zone (19). A processor (41) is in communication with the optical imaging device (29) and is configured to process the captured images and perform a scattering analysis to determine parameters of the material (3) through the passage (5).

20 Claims, 11 Drawing Sheets

(51) Int. Cl.
*G01F 1/86* (2006.01)
*G01N 21/53* (2006.01)
*G01N 21/85* (2006.01)
*G01N 21/94* (2006.01)

(52) U.S. Cl.
CPC ............. *G01N 21/85* (2013.01); *G01N 21/94* (2013.01); *G01N 2021/8578* (2013.01)

(58) Field of Classification Search
CPC ... G01N 2021/4709; G01N 2021/8578; G01N 2021/8592; G01N 21/47; G01N 21/53; G01N 21/94; G01F 1/661; G01F 1/74; G01F 1/86; G01F 1/66

USPC .......... 356/432–448, 335–343, 243.2–243.8, 356/239.1–239.8, 237.1–237.6
See application file for complete search history.

(56) References Cited

U.S. PATENT DOCUMENTS

| | | | |
|---|---|---|---|
| 6,778,272 B2* | 8/2004 | Nakano | H01J 37/32082 356/336 |
| 2009/0219530 A1 | 9/2009 | Mitchell et al. | |
| 2010/0184056 A1* | 7/2010 | Weinberger | B01L 3/508 435/6.16 |
| 2012/0140223 A1 | 6/2012 | Mitchell et al. | |
| 2015/0346101 A1* | 12/2015 | Zhao | G01N 21/47 356/301 |
| 2018/0195945 A1* | 7/2018 | Schneider | G01N 15/0227 |

FOREIGN PATENT DOCUMENTS

| | | |
|---|---|---|
| CN | 104359892 A | 2/2015 |
| DE | 102012218217 | 4/2014 |
| JP | 3951577 B2 | 8/2007 |

OTHER PUBLICATIONS

English Abstract of DE102012218217.
English abstract of CN104330398A.
English abstract of CN104359892A.
English abstract of JP3951577B2.

* cited by examiner

DEVICE AND METHOD FOR MONITORING MATERIAL FLOW PARAMETERS ALONG A PASSAGE

CROSS REFERENCE TO RELATED APPLICATIONS

This United States national phase application claims the benefit under 35 U.S.C. § 371 of PCT Application No. PCT/AU2018/050819 filed on Aug. 7, 2018, which in turn claims priority to Australian Application Serial No. 2017903188 filed on Aug. 10, 2017 and all of whose entire disclosures are incorporated by reference herein.

FIELD OF THE INVENTION

The present invention relates to a device and method for determining material flow parameters and in particular to measuring parameters of airborne particulates such as coal dust flowing through a coal mine. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

In underground coal mining, ventilation systems provide a flow of air to the mine network to remove coal dust and harmful gases. To provide appropriate ventilation, the concentrations of airborne contaminants, such as respirable dust, are sampled at different zones within the mine. These contaminant concentrations are currently sampled in a number of different ways, including personal sampling, static (or fixed) sampling and real-time sampling.

Personal sampling devices are devices used by the miners themselves to allow collection of measurements within the breathing zones of the underground coal mine. These devices include a portable personal monitor, or instruments temporarily introduced into these zones for the purpose of a personal sampling measurement.

Static sampling involves measurement at a fixed point with some associated interval for performing the measurement. Static sampling systems include use of filter paper in specialised instruments which are periodically removed and sent for laboratory analysis to determine the collected mass of material over the measurement time.

Real-time sampling uses instruments to measure instantaneous changes in dust concentrations and records these values as a time series. Most, if not all current real-time systems are single-point sampling systems.

In a similar but separate application, German patent DE102012218217, owned by Siemens AG, relates to a system and method for determining coal mass flow through dust lines of a power plant into a combustion chamber. This document teaches illuminating a small test volume of the flowing coal mass using a pulsed laser and imaging the light reflected off the illuminated coal particles using a camera. The laser transmits two closely timed pulses of light and the camera is controlled to image both pulses within a single image exposure time, thus simultaneously capturing two images offset by the particle velocity. This is similar to the single point real-time sampling systems described above.

Although this may be suitable for the application of sampling dust flow into a power plant combustion chamber, for accurately measuring contaminant levels in the material flow, the inventors have identified that a more comprehensive spatial knowledge of the material flow is desirable. Such comprehensive spatial knowledge is not able to be extrapolated from the system of DE102012218217.

SUMMARY OF THE INVENTION

In accordance with a first aspect of the present invention there is provided a device for measuring parameters of a material flowing along a passage in a first direction, the passage having two longitudinally spaced apart ends and transverse sides defined by one or more sidewalls, the device including:
  a laser source positioned at a first location within or adjacent a side of the passage and configured to generate a laser beam at one or more predetermined frequencies;
  a beam projection element for projecting the laser beam transversely across the passage to irradiate the material within a measuring zone, the measuring zone extending in a direction substantially perpendicular to the first direction and including a transverse region extending greater than 50% of the width of the passage;
  an optical imaging device positioned at a second location within or adjacent the passage and configured to capture images of backscattered light from material within the measuring zone; and
  a processor in communication with the optical imaging device and configured to process the captured images and perform a multiple particle scattering analysis to determine parameters of the material through the passage.

In one embodiment, the beam projection element includes a lens adapted to expand the size of the laser beam in a single transverse dimension to generate a spatially elongated beam. In another embodiment, the beam projection element includes a mirror adapted to expand the size of the laser beam in a single transverse dimension to generate a spatially elongated beam. In one embodiment, the beam projection element includes a scanning mirror adapted to angularly steer the laser beam in a transverse dimension through the measuring zone.

In some embodiments, the optical imaging device includes a camera having a two dimensional array of photosensitive pixels.

In some embodiments, the parameters include a volumetric flow rate of the material through the passage. In some embodiments, the parameters include a two dimensional density distribution of the material within the measuring zone. In some embodiments, the parameters include a particle size distribution of the material within the measuring zone.

In some embodiments, the scattering analysis includes applying a Mie scattering model to the captured images to extract the parameters of the material through the passage. In some embodiments, the scattering analysis includes applying a Rayleigh scattering model to the captured images to extract the parameters of the material through the passage. In some embodiments, the scattering analysis includes applying a linear intensity model to the captured images In some embodiments, the scattering analysis involves determining one or more of an angular dependence, amplitude dependence, wavelength dependence and polarization of the backscattered light.

In some embodiments, the laser source is tunable to selectively vary the frequency of the laser beam. In some embodiments, the laser source is adapted to produce a pulsed laser beam, wherein the pulse duration is less than an exposure time of the optical imaging device.

In some embodiments, the device includes a plurality of laser sources, each configured to generate a laser beam at different respective frequencies.

In some embodiments, a polarizing filter is disposed in front of the optical imaging device for filtering a polarization component from the backscattered light.

In some embodiments, the device includes a second optical imaging device disposed on the first side of the passage and a second polarizing filter disposed in front of the second optical imaging device for filtering a second polarization component from the backscattered light, the second polarization component being different to the first polarization component.

In some embodiments, the device includes a spectroscopy unit for performing spectral analysis on backscattered light from material within the measuring zone. In one embodiment, the spectroscopy unit is configured to perform Raman spectroscopy on the backscattered light. In this embodiment, the spectroscopy unit preferably includes:

- an optical filter configured to filter out the fundamental frequency of the laser beam and pass frequencies shifted due to Raman scattering from the material;
- a spectral analyser configured to analyse the frequencies shifted due to Raman scattering and determine a material composition.

In accordance with a second aspect of the present invention there is provided a method for measuring parameters of a material flowing through a passage in a first direction, the passage having two longitudinally spaced apart ends and transverse sides defined by one or more sidewalls, the method including the steps of:

- projecting, from a first side of the passage, a laser beam transversely across the passage to irradiate the material within a measuring zone, the measuring zone extending in a direction substantially perpendicular to the first direction and including a transverse region extending greater than 50% of the width of the passage;
- capturing, at the first side of the passage, images of backscattered light from material within the measuring zone; and
- processing the captured images and performing a multiple particle scattering analysis to determine parameters of the material through the passage.

BRIEF DESCRIPTION OF THE DRAWINGS

Preferred embodiments of the disclosure will now be described, by way of example only, with reference to the accompanying drawings in which.

DETAILED DESCRIPTION

Device Overview

Figure 1:
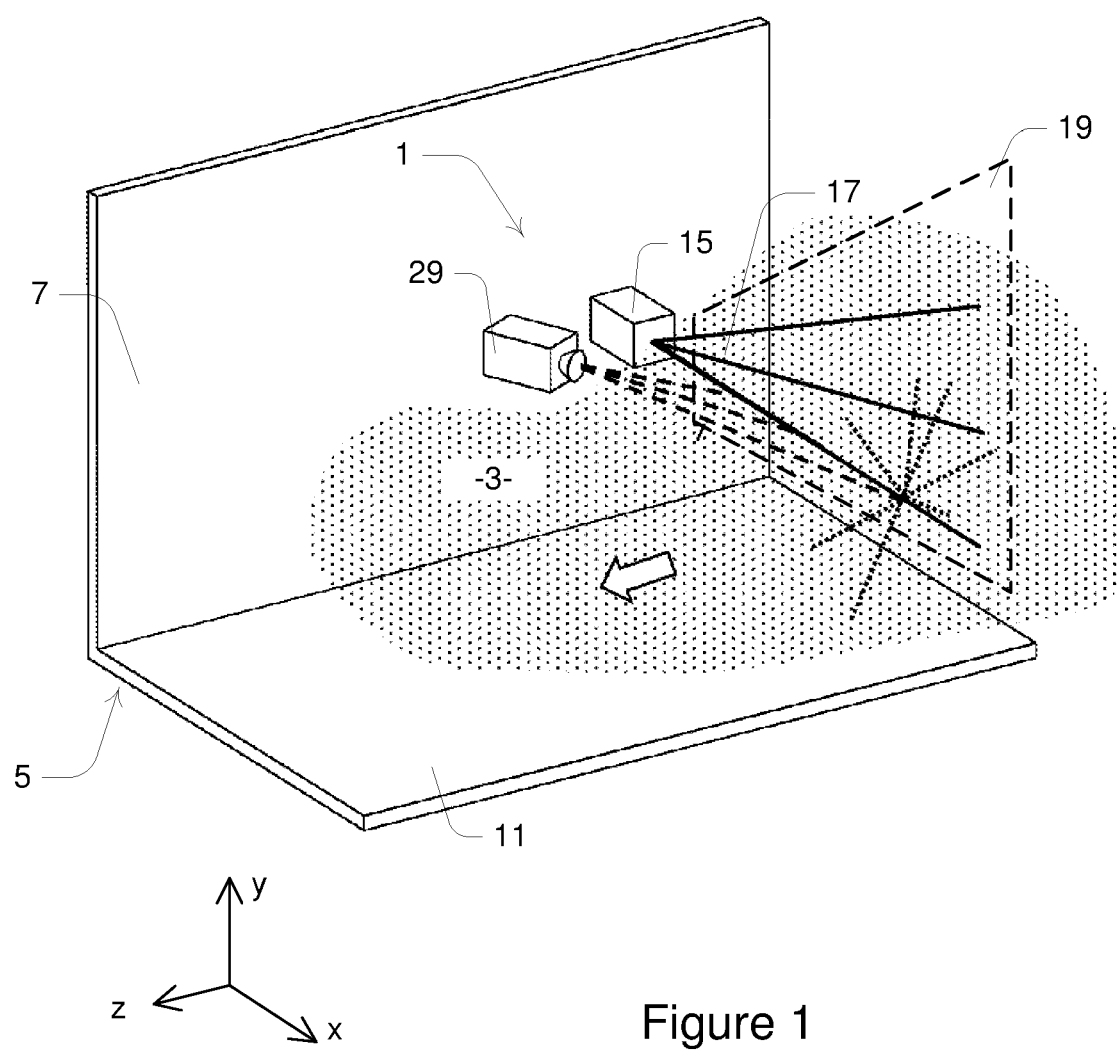
FIG. 1 is a perspective view of a device for measuring parameters of coal dust flowing longitudinally along a substantially rectangular longwall mining tunnel.
Figure 2:
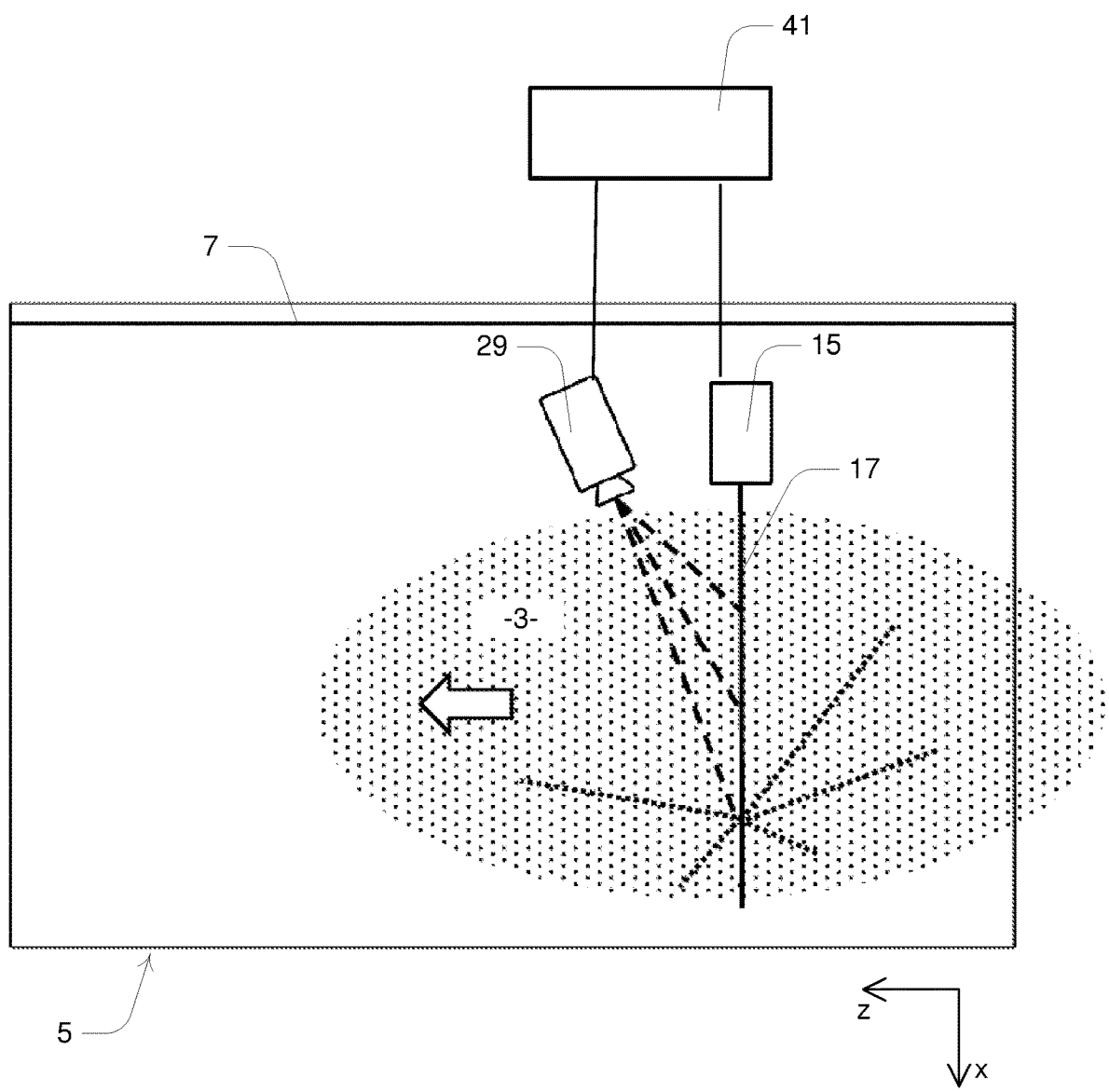
FIG. 2 is a plan view of the device of FIG. 1.
Figure 3:
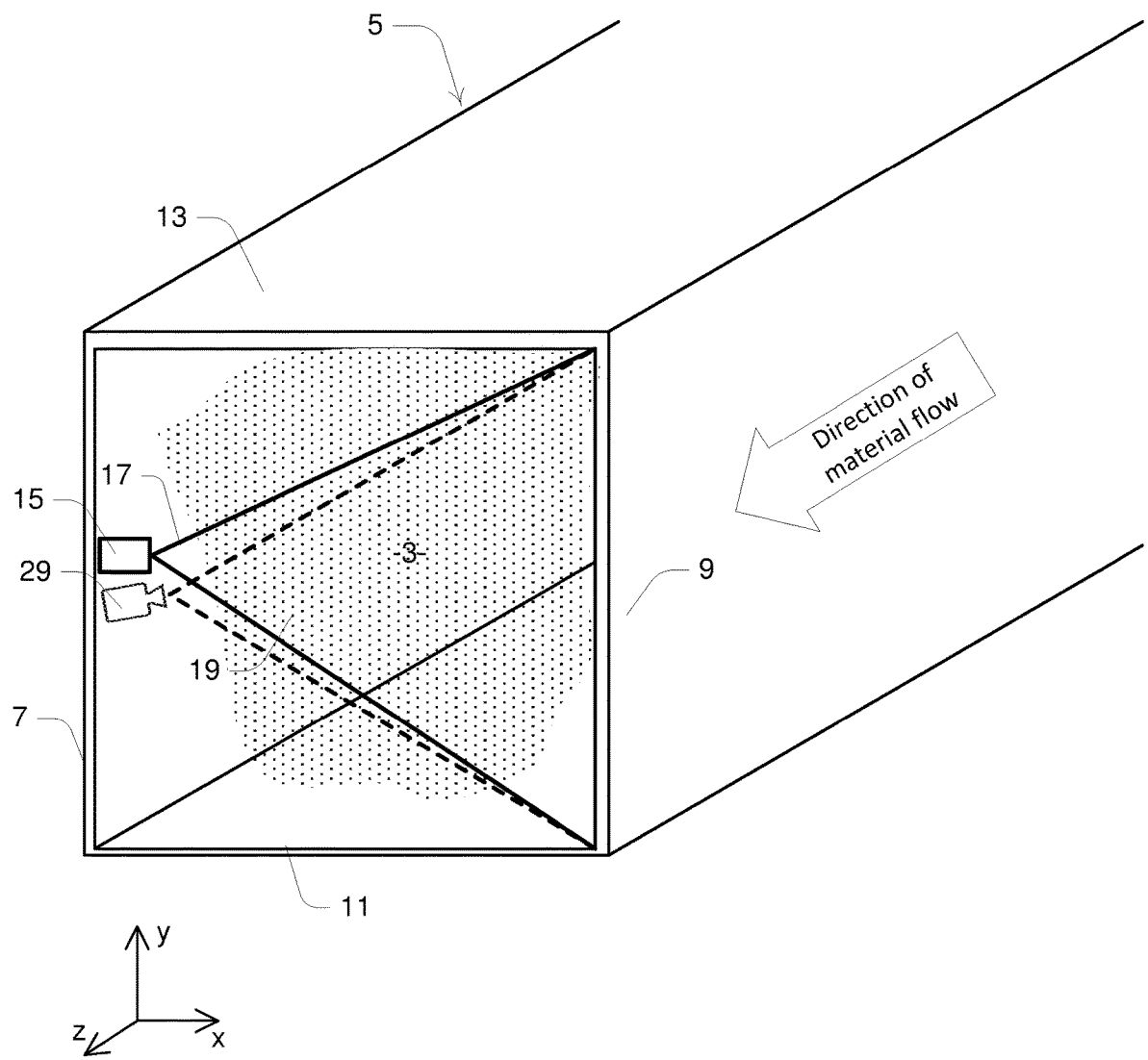
FIG. 3 is a second perspective view of the device of FIG. 1.

Referring initially to FIGS. 1 to 3, there is illustrated a device 1 for measuring parameters of a material 3 flowing longitudinally along a substantially rectangular passage in the form of a longwall mining tunnel 5. In the preferred embodiments of the invention, the material being measured is coal dust 3 and the passage is a longwall mining tunnel having two longitudinally spaced apart ends separated by a distance of up to several hundred metres. In these embodiments, as illustrated best in FIG. 3, the tunnel includes two sidewalls 7, 9 extending from a lower side defined by the tunnel floor 11 to support an upper side defined by the tunnel ceiling 13. Tunnel 5 has typical cross sectional dimensions of several metres such as 5 metres by 5 metres.

However, it will be appreciated that the invention is applicable in a broader range of applications to monitor particulates, gases or fluids through passages of varying dimensions and geometries. By way of example, some embodiments of the invention may also applicable to monitoring coal mass flow through dust lines of a power plant into a combustion chamber. In this application, the dust lines define the passage and may include a square-shaped cross section of four sides or may have a circular cross-section with one continuous sidewall. The invention may also be applicable to monitoring other materials such as fluids flowing through conduits. In various embodiments, the passage of material flow may have substantially any cross-sectional shape, including circular, square, rectangular, oval or other non-geometrical shapes.

As device 1 is typically installed in harsh environments, the device may be enclosed within a flame-proof protective cover (not shown). The protective cover acts to prevent ignition for an explosion in an "Ex d" environment and to protect the device from harsh environmental elements such as dust, fluids and collision.

Device 1 includes a laser source 15 positioned at a first location within tunnel 5 and configured to generate a laser beam 17 at one or more predetermined frequencies. Laser source 15 is illustrated as being positioned mid-way up left sidewall 7 and projecting laser beam 17 substantially horizontally across tunnel 5 to illuminate coal dust 3 within a measuring zone 19. However, it will be appreciated that laser source 15 may be positioned at any lateral and longitudinal position within tunnel 5, including on the ceiling 13 or floor 11 and oriented to project laser beam 17 substantially transversely across the width of tunnel 5. In some embodiments, laser source 15 may be located within or the walls of tunnel 5, or adjacent the walls such as just inside or outside the walls of tunnel 5. In the case where laser source 15 is located outside the walls, laser beam 17 may be projected into tunnel 5 through a transparent window in the wall.

Laser source 15 may include any suitable pulsed or continuous wave laser operating in the visible, infrared or ultra violet wavelength ranges. By way of example, in one embodiment, laser source 15 includes a Laserex Technologies 1 mW 635 nanometre laser diode, which generates a single continuous-wave laser beam. Other types of suitable lasers include solid state, gas, dye and semiconductor lasers. Laser source 15 may be operated at various power levels, operation modes and pumping techniques to suit the particular application.

In some embodiments, laser source 15 is a tunable laser capable of selectively varying the frequency of the output laser beam over a range of predefined frequencies. Illuminating coal dust 3 with different wavelengths allows the extraction of additional information about the coal dust particles, as described below. An example tunable laser is the Newport Corporation TLB-6700 Velocity Tuneable Laser, 632.5-2075 nanometres.

In other embodiments, device 1 may include multiple fixed-frequency lasers such as a combination of Laserex Technologies 1 mW 635 nm, 780 nm, and 850 nm laser diodes. Such an embodiment allows for achieving a similar multi-wavelength measurement to a tunable laser but in a simultaneous manner.

Figure 4:
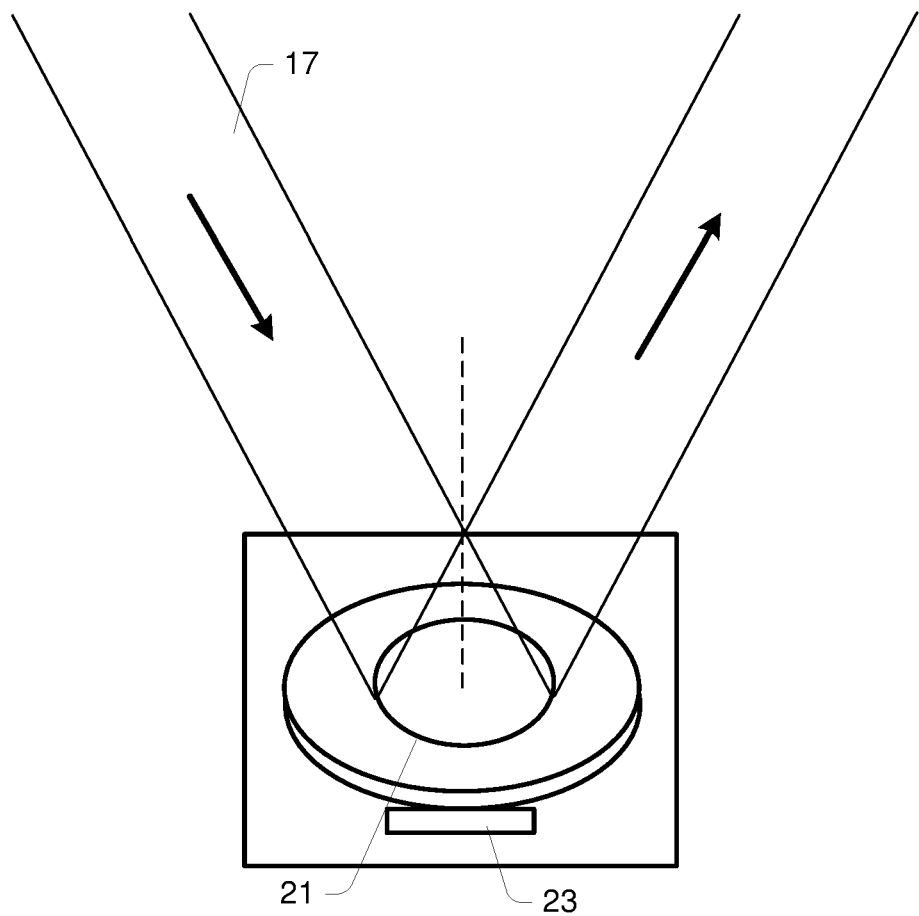
FIG. 4 is a perspective view of a scanning mirror for selectively directing a laser beam in different directions.

As illustrated in FIG. 4, a beam projection element, in the form of a steering mirror 21, projects laser beam 17 transversely across the passage to irradiate the coal dust 3 within measuring zone 19. Mirror 21 includes an actuator 23 for tilting mirror 21 at respective angles along a plane in response to an electrical control signal to scan the laser beam across measuring zone 19. In one embodiment, mirror 21 is a Thorlabs single-axis scanning galvanometer control system. In another embodiment, mirror 21 is a Micro-Electro-Mechanical (MEM) mirror tiltable in one or two dimension. However, mirror 21 may be any type of tiltable mirror capable of steering a laser beam. Mirror 21 is periodically stepwise scanned across a range of angles over time relative to a horizontal plane to angularly steer the laser beam in a transverse dimension through measuring zone 19. The stepwise scanning selectively illuminates different paths of light through measuring zone 19 and allows spatial discrimination of particle scattering.

Mirror 21 may be integral with the housing of laser source 15 or mounted separately and positioned within the beam path of laser source 15. Additional beam conditioning optics may be included within laser 15 or mounted within the beam path of the laser to appropriately shape the beam to a desired beam waist size. The beam conditioning optics may also be responsible for modifying the polarisation of the beam, modulating the frequency of the beam or manipulating the beam in any manner necessary to achieve a desirous beam profile.

Figure 5:
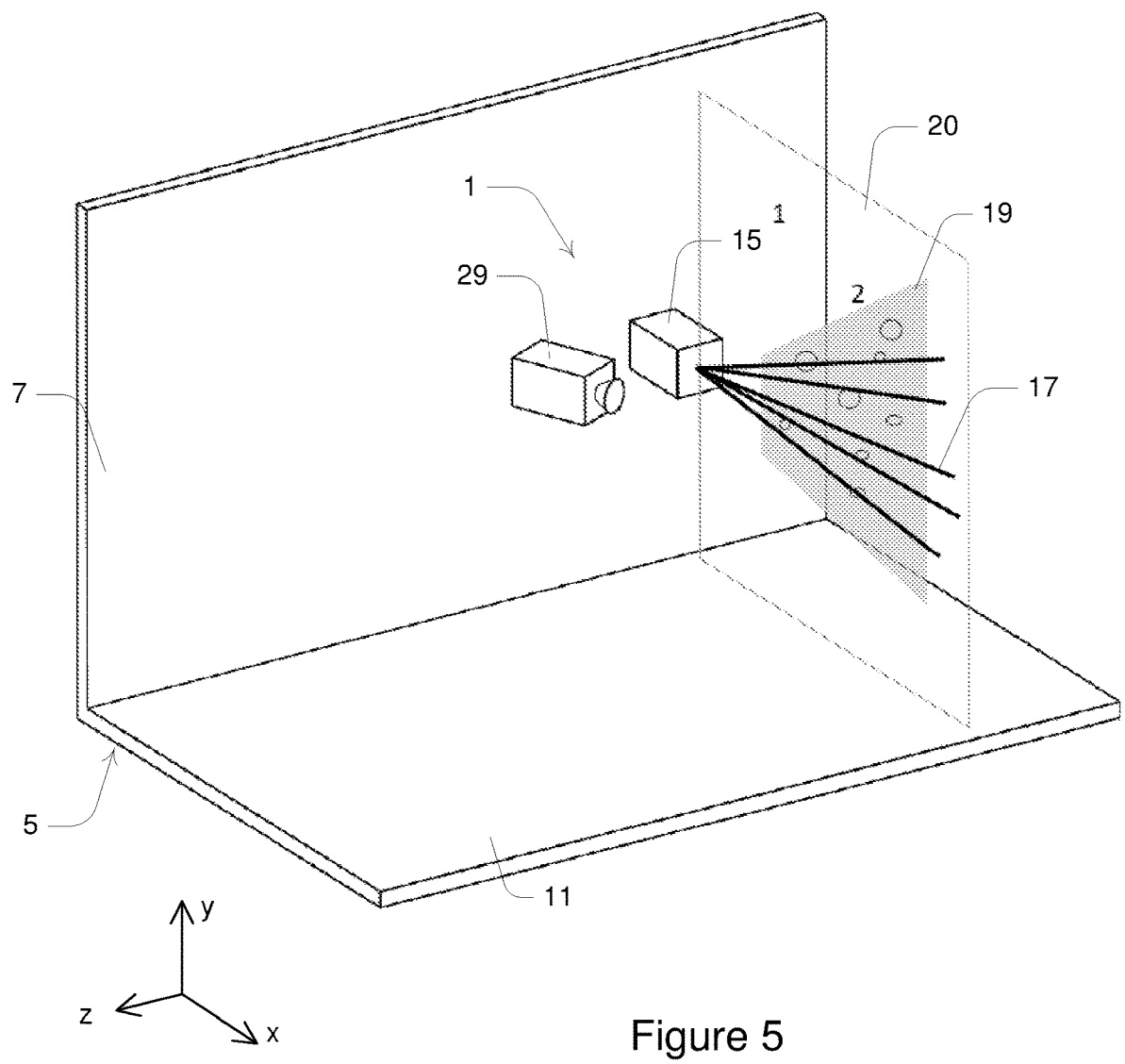
FIG. 5 is a third perspective view of the device of FIG. 1 illustrating an illumination plane of a laser.

As illustrated in FIG. 5, the measuring zone 19 is defined by a plane 20 of illumination of laser beam 17 within the steering angles defined by mirror 21 along plane 20 that extends substantially perpendicular to the direction of material flow. As the tunnel is disposed substantially horizontal in the illustrated example, illumination plane 20 is disposed substantially vertically. By way of example, mirror 21 may steer laser beam 17 vertically along plane 20 across a range of angles between ±30°, 45°, 60°, 75° or 90° relative to a horizontal plane. Different beam angles in this regard are illustrated in FIG. 5. By "substantially" perpendicular to the material flow, it is meant that plane 20 extends within about 10° of being perpendicular to the flow direction. However, in other embodiments, plane 20 may extend more along the flow direction and thus have a greater longitudinal component. In these embodiments, plane 20 may extend 15°, 20°, 25°, 30°, 35°, 40°, 45°, 50° or 60° along the direction of material flow. In some embodiments, mirror 21 may be configured to also steer laser beam 17 along different angles relative to vertical plane 20 to define other imaging planes.

Measuring zone 19 thus includes a transverse region extending across a substantial portion of the cross-sectional area of tunnel 5. Preferably, measuring zone 19 defines a cross-sectional area of greater than 50% of the width of tunnel 5. In some embodiments, measuring zone 19 defines a cross-sectional area of greater than, 75%, 85%, 90% or 95% of the area of tunnel 5.

Figure 6:
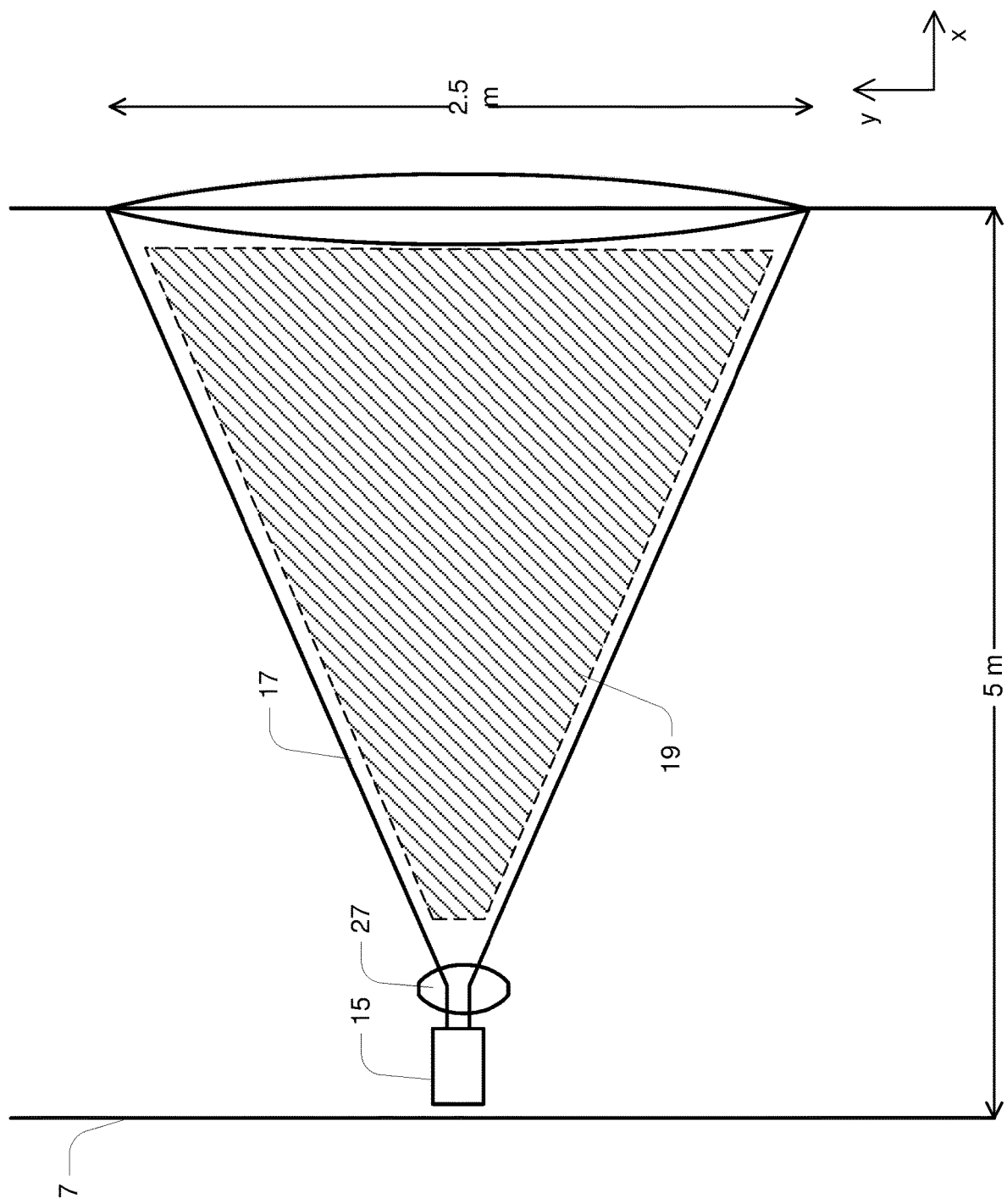
FIG. 6 is a side view of the device of FIG. 1 illustrating a measuring zone.

In an alternative embodiment, illustrated in FIG. 6, the beam projection element includes a convex lens 27 adapted to expand the size of the laser beam in the vertical dimension to generate a spatially elongated beam which covers the measuring zone 19. In this embodiment, the laser beam is not scanned across the measuring zone as described above but rather the entire measuring zone is simultaneously illuminated by the vertically elongated beam. A suitable lens for the tunnel dimensions described herein is a Thorlabs plano-convex cylindrical lens LJ1598L1-A AR coated for 350-700 nanometres with focal length 3.9 mm. Such a lens is capable of expanding a beam of initial spot size of 1 millimetre to a line of width 1 millimetre and length 2.5 metres at a range of 5 metres, thereby creating a wedge-shaped volume in the illumination plane.

In a further alternative embodiment (not illustrated), the beam projection element includes a convex mirror adapted to expand the size of the laser beam in a vertical transverse dimension. The mirror generates a spatially elongated beam in a similar manner to the lens described above. In other embodiments, the beam projection element includes compound lenses, mirrors, prisms and combinations thereof.

Referring again to FIGS. 1 to 3, device 1 includes an optical imaging device in the form of a high resolution digital camera 29 positioned at a second location within or adjacent tunnel 5. Camera 29 includes a two dimensional array of photosensitive pixels configured to capture images of backscattered light from coal dust 3 propagating through tunnel 5 and located within measuring zone 19. Camera 29 is positioned on sidewall 7 adjacent laser source 15 and oriented at an angle so as to image substantially the entire measuring zone 19. However, it will be appreciated that camera 29 may be positioned at any location around tunnel 5 relative to laser source 15. Camera 29 is preferably positioned adjacent to an exit aperture of laser source 15 and offset from the illumination plane by a distance that is small compared to the dimensions of the cross-sectional dimensions of tunnel 5. In the case where tunnel 5 has cross-sectional dimensions of 5×5 metres, the offset between camera 29 and laser 15 is preferably in the order of 10 centimetres.

By way of example, camera 29 may be a Point Grey Grasshopper 3 9.1 megapixel Mono GigE Vision GS3-PGE-91S6M-C camera. Camera 29 has a field of view (FOV) such that the path of the laser beam through the illumination plane is visible to the camera image. One suitable camera lens is a Fujinon CF12.5HA-1, 12.5 mm, 1", C-mount lens enabling a FOV to include an object of height 4 metres and width 5.3 metres at a range of 5 metres. However, the invention is by no means limited to the above exemplary hardware and various other camera sensors and optics may be used.

Discrimination of laser light from background light sources can be improved by the introduction of a narrow-band filter (not shown) centred on the laser frequency, such as a 636/8 nanometres BrightLine single-band bandpass filter FF01-636/8-25. The angle-of-incidence within the FOV of camera 29 must be within the bandpass of the filter, being 0°±5° in this example.

The camera FOV can independently image either the whole or part of the illuminated volume through variation of the choice of camera lens. A wide field of view such as from Fujinon DF6HA-1B 6 mm, C-mount lens will create significant Fish-Eye distortion requiring correction, but otherwise enables imaging of the whole illuminated plane. A narrow field of view may image only a portion of measuring zone 19. In some embodiments, camera 29 is mounted to a rotatable mount which is electrically controlled to image different regions of measuring zone 19 at different times and to construct a composite image of the zone.

Camera 29 is preferably longitudinally aligned with laser source 15 to within a small offset, such as about 10 centimetres as described above. This positioning ensures camera 29 images almost directly transversely across tunnel 5. However, it will be appreciated that both laser source 15 and camera 29 may be oriented at non-normal angles to the longitudinal tunnel dimension and material flow. Where illumination plane 20 and measuring zone 19 have longitudinal components, additional calculations are required to extrapolate flow parameters of the coal dust. This may be performed through a calibration when no coal dust is flowing through tunnel 5 and or by incorporating Doppler flow parameters into the calculations.

Figure 7:
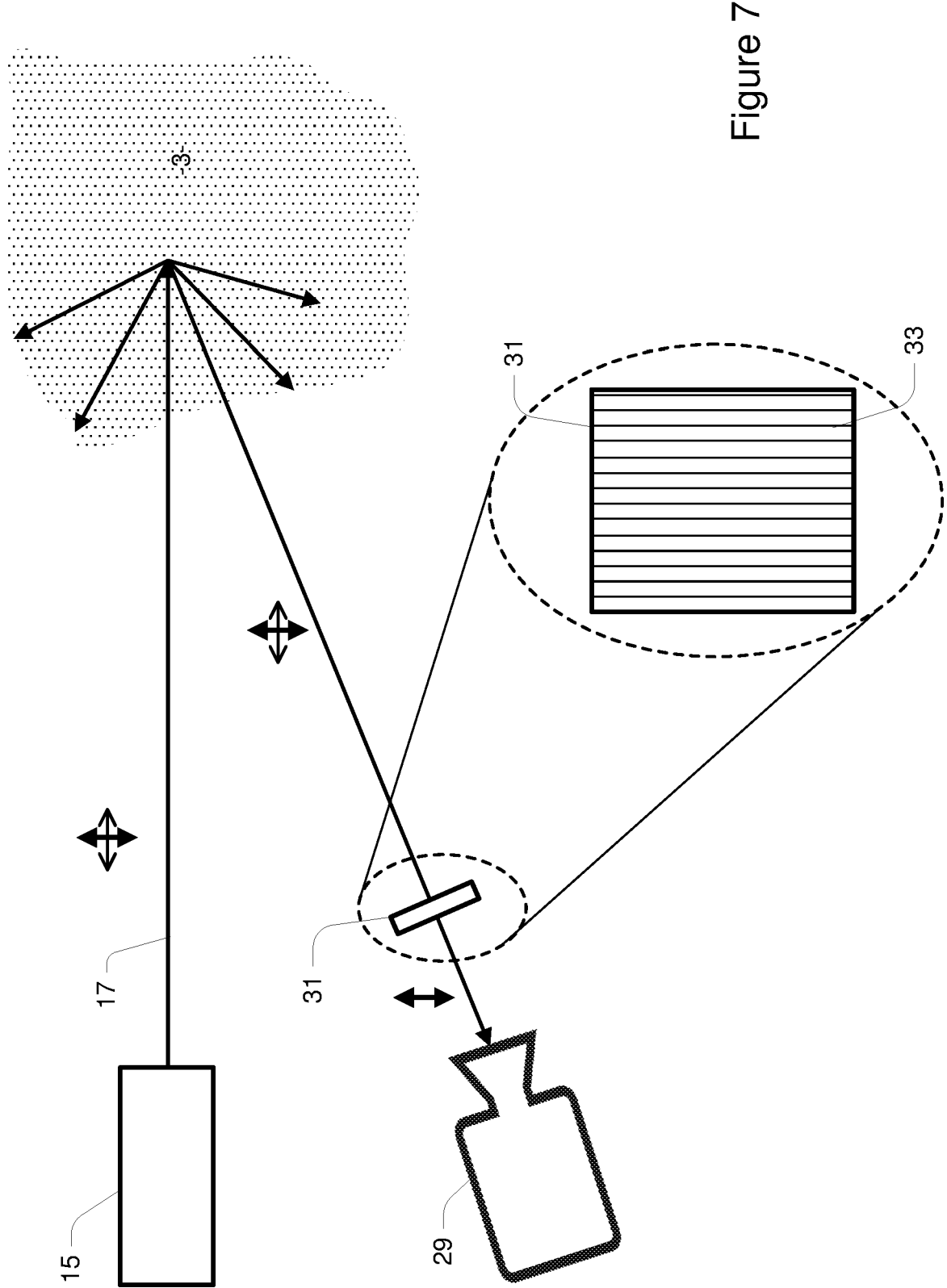
FIG. 7 is a schematic side view of a device for measuring parameters of coal dust including a polarisation filter.

Referring to FIG. 7, in some embodiments, a polarizing filter 31 is disposed in front of camera 29 for filtering a first polarization component from the backscattered light. In the illustrated embodiment, filter 31 includes a wire grid polariser 33 which acts as a linear polarizer to transmit only vertically polarized components to camera 29. Horizontally polarized components are absorbed by polariser 33. In other embodiments, filter 31 is replaced with other types of linear polarisers such as beam splitting polarisers and/or or circular polarisers incorporating a quarter wave plate. The polarizer may also have polarization axes oriented at other angles.

Figure 8:
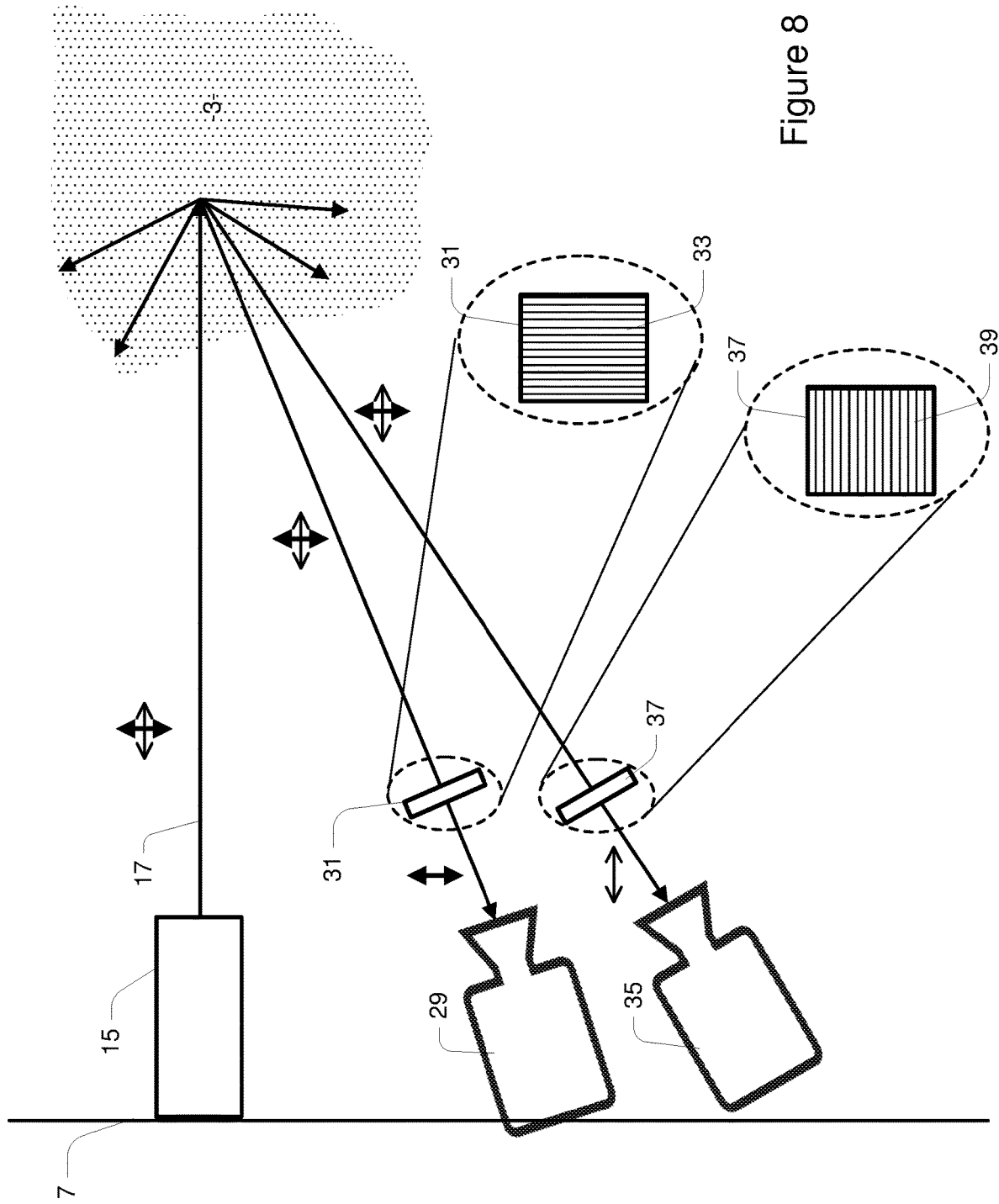
FIG. 8 is a schematic side view of a device for measuring parameters of coal dust including two cameras and respective polarisation filters of orthogonal orientation.

Referring to FIG. 8, in one embodiment, a second camera 35 is disposed on the side 7 of tunnel 5 adjacent camera 29 and a second polarizing filter 37 disposed in front of camera 35 for filtering a horizontal polarization component from the backscattered light. Filter 37 includes a wire grid polariser 39 which acts as a linear polarizer to transmit only horizontal polarized components. Although the illustrated filters are configured to filter vertical and horizontal polarized light respectively, it will be appreciated that filters having any arbitrary orthogonal polarization axes may be used. The device illustrated in FIG. 8 allows for discrimination of polarization and for identification of any polarization influence of the scattering interaction. The polarization influence can be input to a scattering model as described below.

Returning to FIG. 2, device 1 includes a processor 41 in communication with camera 29. Processor may be a separate device such as a personal computer, laptop or tablet computer, or may be a dedicated microprocessor integrated with camera 29 and/or laser source 15. Processor 41 is configured to process the images captured by camera 29 and perform a multiple particle scattering analysis to determine parameters of the coal dust 3 through tunnel 5. As described below, various types of scattering analysis are possible on the captured images within the scope of the invention, all of which involve modelling the scattering field of a plurality of particles (e.g. a particle distribution model). The parameters that are measurable by the invention include a volumetric flow rate of coal dust 3 through tunnel 5, a two dimensional density distribution of coal dust 3 within measuring zone 19 and a particle size distribution of coal dust 3 within measuring zone 19.

In one embodiment the scattering analysis includes applying a Mie scattering model to the captured images to extract the parameters of the material through the passage. Details of an example model using Mie scattering theory is described below. In another embodiment, the scattering analysis includes applying a Rayleigh scattering model to the captured images to extract the parameters of the material through the passage. In a further embodiment, the scattering analysis includes applying a linear intensity model to the captured images. In another embodiment, the scattering analysis includes applying a Monte Carlo model to extract the parameters of the material through the passage.

Regardless of the type of model used, the scattering analysis involves determining one or more of an angular dependence, amplitude dependence, wavelength dependence and polarization of the backscattered light.

Example Implementation

Figure 9:
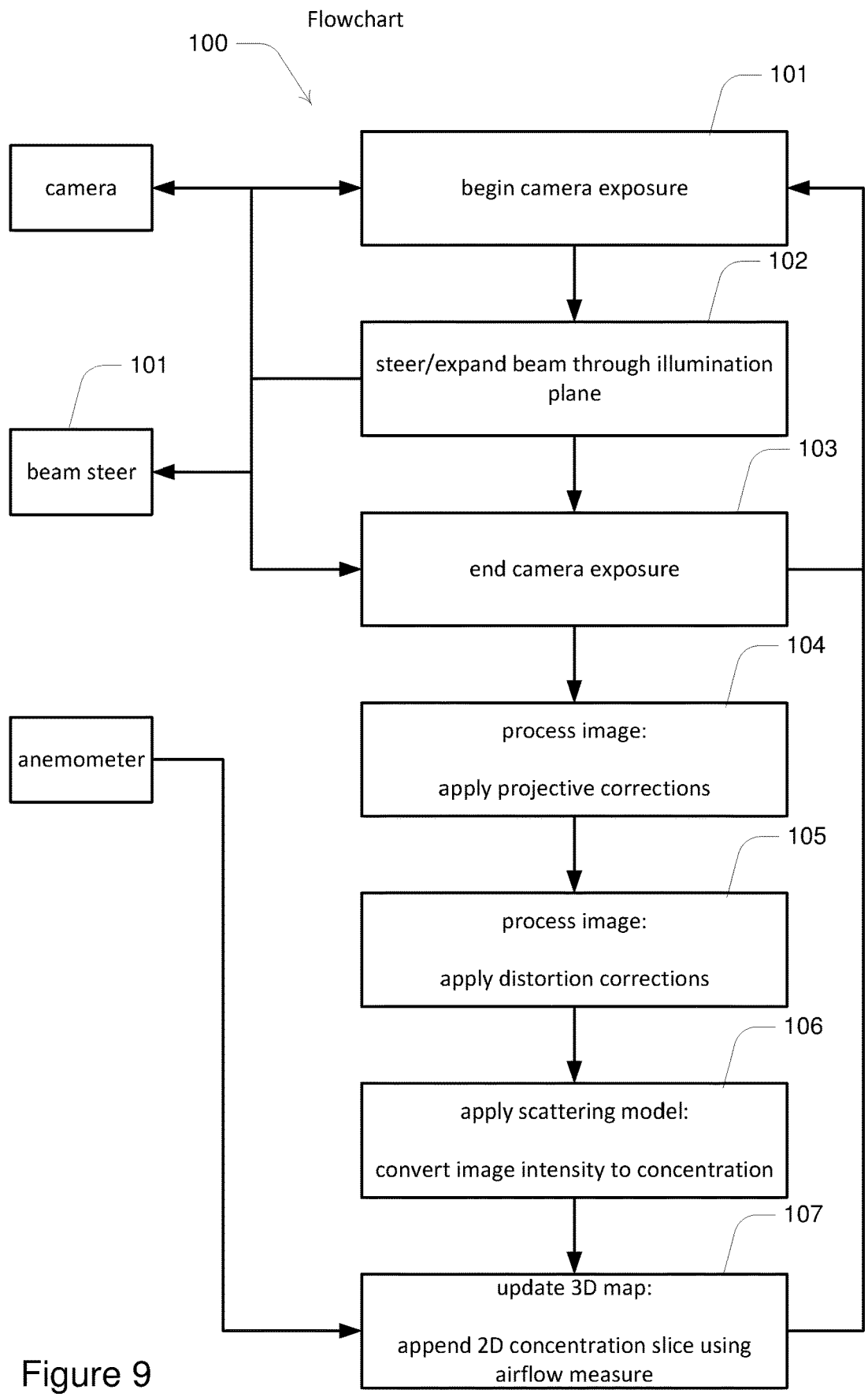
FIG. 9 is a process flow diagram illustrating the primary steps in a method of measuring parameters of coal dust flowing along a tunnel.

An example implementation of the invention will now be described with reference to method 100 illustrated in the process flow diagram of FIG. 9.

In use, device 1 is situated at an appropriate location along tunnel 5 within a protective flame-proof cover and connected to a suitable power supply. Once powered on and activated, at steps 101 to 103, laser source 15 is controlled by processor 41 or a separate controller to steer laser beam 17 along illumination plane 20. During this scanning process, camera 29 is activated to image any laser light that is scattered, by coal dust 3 located within measuring zone 19, at angles within the camera FOV during the image exposure time. As the laser beam 17 penetrates through a cross-sectional area of tunnel 5, backscattering occurs at points along the path of the beam. Camera 29 is positioned to capture the backscattered light along the path of the beam at a specific range of angles to distinguish a dust distribution profile across the width of tunnel 5. The exposure time of camera 29 preferably encompasses the scan time of laser source 15 across the full range of angles. However, in other embodiments, camera 29 is configured to capture images of the scattering at each angle of laser beam 17 through measuring zone 19.

The laser beam only illuminates dust that is present in the thin volume of measuring zone 17 that closely approximates illumination plane 20 through which the laser beam axis is steered. The thickness of the volume approximated by measuring zone 19 is determined by the diameter of laser beam 17, also referred to as the beam spot size, which is non zero. The spot size also varies with distance along the beam axis according to the principles of laser beam propagation and as approximated by Gaussian beam optics. The spot size at a given longitudinal position along the beam axis is where the central intensity of the beam profile perpendicular to the beam axis falls to the fraction $1/e$ of the value on beam axis, where $e$ is the mathematical constant that is the base of the natural logarithm. The minimum value is called the beam waist. The spot size over the whole beam path can be arranged to be approximately constant and much smaller than the path length of the laser beam and linear dimensions of the cross-sectional area of the illumination plane, using standard optical engineering. Example parameters are a laser beam with wavelength of 635 nanometres and beam waist size of 1 millimetre that gives a Rayleigh range of approximately 5 metres, thus the spot size would expand to approximately 1.1 millimetres over a beam path of 5 metres centred on the beam waist. Thus the practical width of the illuminated volume approximated by illumination plane 20 is 1 millimetre in this example. Thus the image formed from laser light scattered by dust into the camera FOV represents a two-dimensional image of the illumination plane approximated by the illuminated volume.

Figure 10:
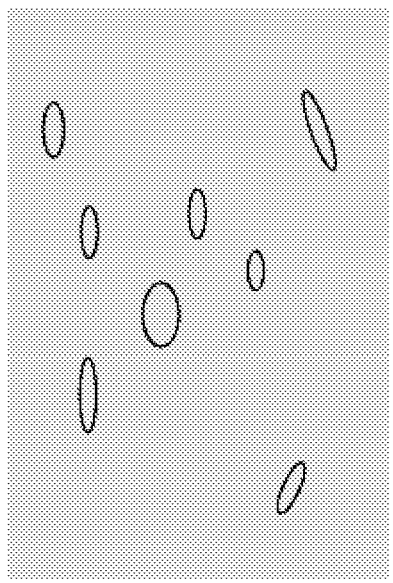
FIG. 10 is a schematic illustration of a transformation of an image captured at an angle to a measuring zone into a conventional two dimensional image.
Figure 10:
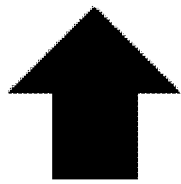
Figure 10:
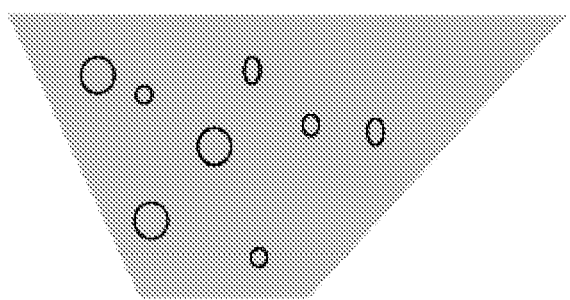

At steps 104 and 105, the captured image is processed. Knowledge of the relative geometrical arrangement of the 2D illumination plane and the camera FOV enables a projective transformation to be computed between the 2D illumination plane and the camera image. An example of a projective transformation is the Keystone transformation to compensate for Keystone distortion effects resulting from the camera being offset from the 2D illumination plane. Each pixel in the image maps via a projective transformation to a corresponding small area in the 2D illumination plane approximating the illuminated plane volume. Thus a projective transformation allows unique identification of the 3D position of the source of light recorded in each of the camera image pixels. This is illustrated schematically in FIG. 10.

If there is no airflow present, light is scattered from stationary coal dust within the thin volume defining measuring zone 19. If airflow is present, dust will move through measuring zone 19 during the time that the laser beam is steered through the range of angles along illumination plane 20. If the laser beam is steered slowly through measuring zone 19 compared to the time taken for coal dust to pass through the zone, then the volume containing dust illuminated by the laser beam is skewed along the direction of airflow. If the beam is steered quickly through measuring zone 19 compared to the time taken for coal dust to pass through the zone, then the illuminated volume approaches and is approximated by illumination plane 20.

In embodiments incorporating a scanning mirror (see FIGS. 1 to 5), the laser beam is steered through the illumination plane within the time for one exposure frame of the camera or sensor integration time. This admits a single steering of the beam through the illumination plane or multiple repetitions of steering of the beam through the illumination plane. By way of example, under conditions where the airflow speed is 5 metres per second, the camera exposure time is set to 0.04 milliseconds, a single steering of laser beam 17 is performed through illumination plane 20 is executed during this time, the average beam spot size is 1 millimetre. In this example, the illuminated volume has a cross-section equal to the area swept out by the laser beam within one camera exposure, and has a thickness of approximately 200 microns, and thus the illuminated volume is skewed by one fifth of the width of the illumination plane volume. Such distortions due to skewing can be accounted for and corrected at step 105.

In embodiments incorporating a beam expanding prism (see FIG. 6), for a given airflow speed, the camera exposure time controls the amount of collected scattered light from dust passing through the illuminated volume. In this example, the illuminated volume is the same as measuring zone 19 since laser beam 17 is not moving during the camera exposure.

At step 106, the image data is fed to a scattering model to estimate parameters of the coal dust. Using the model, images recorded by camera 29 of light scattered from coal dust in measuring zone 19 are used to infer properties about the dust in the illumination plane. As mentioned above, information can include dust density, particle size, and particle composition. These properties are furthermore determined at each of the points in the 2D image and by extension, throughout the three dimensional volume using a sequence of camera images from device 1 over time.

In addition to the scattering analysis performed, spectroscopic analysis may also be performed on the backscattered light to extract additional information on the material flow. For example, Raman spectroscopy may be performed by filtering the elastically scattered light (e.g. from Rayleigh and Mie scattering) using an optical filter and passing the remaining light corresponding to spontaneous Raman scattering to a detector. Light scattered through spontaneous Raman scattering contains information on the vibrational or rotational energy states of the atoms in the material from which it was scattered. In Raman spectroscopy, the frequency shift resulting from vibrational or rotational energy transferred from the material to the photons in the laser beam can be detected. The frequency shift (to a lower or higher frequency—called a Stokes shift or anti-Stokes shift respectively) from the fundamental laser frequency provides an indication of the molecules or material from which the light has been scattered. In some cases, Raman spectroscopy can also be used to estimate a temperature of a known material.

Figure 11:
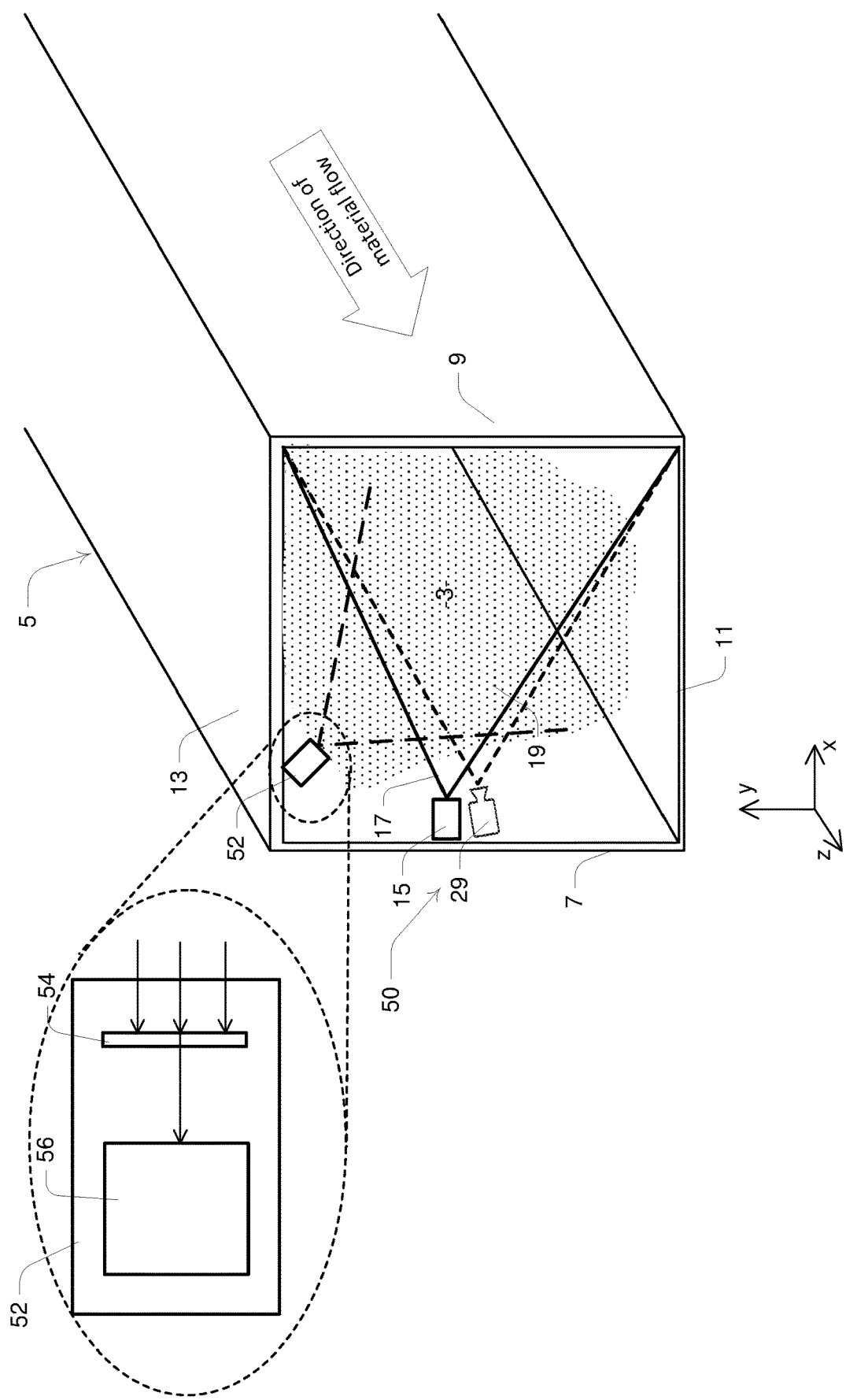
FIG. 11 is a perspective view of an alternative embodiment device for measuring parameters of coal dust flowing longitudinally along a substantially rectangular longwall mining tunnel, the device including a spectroscopy unit.

In one embodiment device 50, illustrated in FIG. 11, a spectroscopy unit 52 is mounted within or adjacent to sidewall 13 of tunnel 5 to receive light backscattered from measuring zone 19. Unit 52 may be mounted to other locations within or adjacent one of the walls of tunnel 5. The spectroscopy unit 52 includes an optical filter 54 configured to suppress the fundamental frequency of the laser beam and pass frequencies corresponding to Stokes shifted (downshifted) frequencies or anti-Stokes shifted (upshifted) frequencies from Raman scattering interactions with material 3. Spectroscopy unit 52 also includes a spectral analyser 56 to identify the spectral power components of the light passed through the optical filter 54. Spectroscopy unit 50 may include a processor (not shown) to perform the spectral analysis to deduce particle composition from the received spectrum. However, in other embodiments, spectral analyser 56 may have its own processor or spectroscopy unit 50 may leverage processor 41 or to perform this spectral analysis.

Through use of multiple devices 1 disposed along tunnel 5, the flow of coal dust along the tunnel can be imaged in three dimensions across time by capturing simultaneous 2D images using the multiple systems.

At step 107, the 2D image data can be added to earlier gathered image data to build a 3D map of the system being monitored. Data from an anemometer can be used here for appropriate modelling of the material flow.

Use of a wideband tunable laser provides for obtaining additional information to aid the model for unambiguous determination of dust properties. For example, particles of size 0.2 micron range from $\lambda/10$ to $\lambda/3$, where $\lambda$ is the laser wavelength, and can transition from having a very strong dependence upon the scattered light with wavelength to weaker dependence as the laser wavelength is varied. In combination with the model used, the additional information obtained from wavelength dependence can be used to aid in unambiguous determination of dust properties.

Alternatively, the use of multiple fixed-frequency lasers can be used to provide wavelength dependence information for inputting to the scattering model. The scattering model provides the dependence of wavelength upon dust properties such as size and composition.

In embodiments wherein laser source 15 includes a pulsed laser, the laser is preferably adapted to produce a pulsed laser beam having pulse duration less than an exposure time of the optical imaging device.

The use of device 1 described above allows for the performing of a method for measuring parameters of a material flowing through a passage. The method includes the steps of:

- projecting, from a first side of the passage, a laser beam transversely across the passage to irradiate the material within a measuring zone, the measuring zone including a transverse region extending greater than 50% of the width of the passage;
- capturing, at the first side of the passage, images of backscattered light from material within the measuring zone; and
- processing the captured images and performing a scattering analysis to determine parameters of the material through the passage.

Example Scattering Model

The processor is configured to process the captured images and perform a multiple particle scattering analysis to determine a measure of flow parameters of the material through the passage. The scattering analysis described herein is based on a Mie scattering model, which utilizes Mie scattering theory. However, it will be appreciated that scattering analysis based on other models, such as Rayleigh scattering, Monte Carlo modelling or linear intensity modelling, can be used.

Mie theory describes the scattering of an electromagnetic plane wave by an object of predefined shape. In this case, the objects, representing the coal dust particles, are modelled as spheres and the resulting scattered light represents a series of spherical waves. The theory can be modelled numerically as a series approximation to a solution of Maxwell's equations for electromagnetism.

In an example Mie scattering model, the scattered electric field for an incident plane wave (laser beam) can be approximated as follows:

$$\vec{E}_{scat} = -E_0 \sum_{l=1}^{\infty} i^{-1} \frac{(2l+1)}{l(l+1)} \left[ b_l \vec{M}_{l,1,e} - i a_l \vec{N}_{l,1,o} \right]$$

Where $E_0$ is the incident electric field strength, $l$ is an order term, N is the refractive index of the particle, and a and b are scattering coefficients.

Mie scattering models apply where the particle size is of a similar order of magnitude to the wavelength of the incident electromagnetic radiation. In cases where the particles are smaller than around 10% of the wavelength of incident electromagnetic radiation, a model utilising Rayleigh scattering theory can be more appropriately applied.

In a Rayleigh scattering model, the intensity of the scattered light is given by the following equation:

$$I = I_0 \left( \frac{1+\cos^2\theta}{2R^2} \right) \left( \frac{2\pi}{\lambda} \right)^4 \left( \frac{n^2-1}{n^2+2} \right)^2 \left( \frac{d}{2} \right)^6$$

where $I_0$ is the light intensity before the interaction with the particle, R is the distance between the particle and the camera, θ is the scattering angle, n is the refractive index of the particle, and d is the diameter of the particle.

The above models or similar models can be applied to the images to estimate parameters of the coal dust. More advanced models may incorporate wavelength and polarization of the incident and scattered radiation.

Conclusions

It will be appreciated that the invention relates to a device for performing real-time monitoring of airborne particulates in a two dimensional area as a volumetric measurement; i.e. a three dimensional (3D) map of concentrations within a target volume. In particular, imaging backscattered light along a path of a laser beam provides depth information of the dust particle distribution across a passage. Existing known systems are not able to accurately measure the depth information of the dust particles.

The invention allows measurement of the evolution and prediction of dust clouds through an environment being monitored.

Interpretation

It will be understood by one skilled in the art that the frequency and wavelength of a laser beam are connected by the equation:

Speed of light=wavelength*frequency.

As a consequence, when reference is made to frequency shifting, frequency converting, frequency broadening, different frequencies and similar terms, these are interchangeable with the corresponding terms wavelength shifting, wavelength converting, wavelength broadening, different wavelengths and the like.

Throughout this specification, use of the term "element" is intended to mean either a single unitary component or a collection of components that combine to perform a specific function or purpose.

Unless specifically stated otherwise, as apparent from the following discussions, it is appreciated that throughout the specification discussions utilizing terms such as "processing," "computing," "calculating," "determining", "analysing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

We claim:

1. A device for measuring parameters of a material flowing along a passage in a first direction, the device including:
   a laser source positioned at a first location within the passage in a mining environment and configured to generate a laser beam at one or more predetermined frequencies, said passage having two longitudinally spaced apart ends and transverse sides defined by one or more sidewalls;
   a beam projection element configured to project the laser beam transversely across the passage to irradiate an airborne particulate material within a measuring zone, the measuring zone extending in a direction substantially perpendicular to the first direction and including a transverse region extending greater than 50% of the width of the passage;

an optical imaging device positioned at a second location within or adjacent the passage and configured to capture images of backscattered light from material within the measuring zone; and a processor in communication with the optical imaging device and configured to process the captured images and perform a multiple particle scattering analysis to determine parameters of the material through the passage.

2. A device according to claim 1 wherein the beam projection element includes a lens adapted to expand the size of the laser beam in a single transverse dimension to generate a spatially elongated beam.

3. A device according to claim 1 wherein the beam projection element includes a mirror adapted to expand the size of the laser beam in a single transverse dimension to generate a spatially elongated beam.

4. A device according to claim 1 wherein the beam projection element is a scanning mirror adapted to angularly steer the laser beam in a transverse dimension through the measuring zone.

5. A device according to claim 1 wherein the optical imaging device includes a camera having a two dimensional array of photosensitive pixels.

6. A device according to claim 1 wherein the parameters include a volumetric flow rate of the material through the passage.

7. A device according to claim 1 wherein the parameters include a two dimensional density distribution of the material within the measuring zone.

8. A device according to claim 1 wherein the parameters include a particle size distribution of the material within the measuring zone.

9. A device according to claim 1 wherein the scattering analysis includes applying a Mie scattering model to the captured images to extract the parameters of the material through the passage.

10. A device according to claim 1 wherein the scattering analysis includes applying a Rayleigh scattering model to the captured images to extract the parameters of the material through the passage.

11. A device according to claim 1 wherein the scattering analysis includes applying a linear intensity model to the captured images.

12. A device according to claim 1 wherein the scattering analysis involves determining one or more of an angular dependence, amplitude dependence, wavelength dependence and polarization of the backscattered light.

13. A device according to claim 1 wherein the laser source is tunable to selectively vary the frequency of the laser beam.

14. A device according to claim 1 wherein the laser source is adapted to produce a pulsed laser beam, wherein the pulse duration is less than an exposure time of the optical imaging device.

15. A device according to claim 1 including a plurality of laser sources, each configured to generate a laser beam at different respective frequencies.

16. A device according to claim 1 including a polarizing filter disposed in front of the optical imaging device for filtering a polarization component from the backscattered light.

17. A device according to claim 15 including a second optical imaging device disposed on the first side of the passage and a second polarizing filter disposed in front of the second optical imaging device for filtering a second polarization component from the backscattered light, the second polarization component being different to the first polarization component.

18. A device according to claim 1 including a spectroscopy unit for performing spectral analysis on backscattered light from material within the measuring zone.

19. A device according to claim 18 wherein the spectroscopy unit is configured to perform Raman spectroscopy on the backscattered light.

20. A method for measuring parameters of a material flowing through a passage in a first direction, the method including the steps of:

projecting, from a first side within the passage within a mining environment, a laser beam transversely across the passage to irradiate an airborne particulate material within a measuring zone, the measuring zone extending in a direction substantially perpendicular to the first direction and including a transverse region extending greater than 50% of the width of the passage, said passage having two longitudinally spaced apart ends and transverse sides defined by one or more sidewalls;

capturing, at the first side of the passage, images of backscattered light from material within the measuring zone; and processing the captured images and performing a multiple particle scattering analysis to determine parameters of the material through the passage.

* * * * *